United States Patent [19]

Mejia

[11] Patent Number: 4,539,270
[45] Date of Patent: Sep. 3, 1985

[54] BATTERY CAP INDICATOR WITH LEVERED FLOAT

[76] Inventor: Santiago Mejia, 525 N. Ocean Blvd. #1024, Pompano Beach, Fla. 33062

[21] Appl. No.: 563,367

[22] Filed: Dec. 20, 1983

[51] Int. Cl.³ .................... H01M 10/48; G01F 23/06
[52] U.S. Cl. ........................................ 429/91; 73/317
[58] Field of Search ................ 429/63, 69, 91; 73/317

[56] References Cited

U.S. PATENT DOCUMENTS

| | | | |
|---|---|---|---|
| 1,482,852 | 2/1924 | Kloepper | 73/291 |
| 1,526,850 | 2/1925 | Davis et al. | 73/447 |
| 2,054,691 | 7/1936 | Browne | 429/91 X |
| 2,400,228 | 5/1946 | Franz et al. | 73/306 |
| 2,631,183 | 3/1953 | Babis | 73/444 |
| 2,840,034 | 6/1958 | Danias | 73/307 |
| 2,889,708 | 6/1959 | Williams | 73/317 |
| 3,012,437 | 12/1961 | Clark et al. | 73/317 |
| 3,079,887 | 3/1963 | Dawkins | 429/91 |
| 3,080,753 | 3/1963 | Tickner et al. | 73/306 |
| 3,218,858 | 11/1965 | Van Woert | 429/91 X |
| 3,915,753 | 10/1975 | Melone | 73/327 |

Primary Examiner—Brian E. Hearn
Assistant Examiner—Stephen J. Kalafut
Attorney, Agent, or Firm—Shlesinger, Arkwright, Garvey & Fado

[57] ABSTRACT

A battery cap is disclosed which permits visual determination of the state of battery fluid level and density, each of which is shown by one of two indicator flags within the battery cap.

10 Claims, 4 Drawing Figures

BATTERY CAP INDICATOR WITH LEVERED FLOAT

BACKGROUND OF INVENTION

This invention relates to battery caps, and particularly to a battery cap which readily permits visual determination of the state of the battery fluid level and density without requiring removal of the battery cap itself.

Battery caps in the past have required removal of the battery to determine liquid level, and physical removal and sampling of the electrolyte to determine its condition.

There are battery cap constructions which permit through a transparent window a visual determination of the state of the battery without removing the cap. My copending application Ser. No. 522,529 filed Aug. 12, 1983, shows the use of a transparent window in a battery cap. Such use is shown in patents such as Sinclair No. 3,170,325 and Gosheff No. 2,484,163.

Other battery cap designs which are of interest with respect to this construction are shown in the Malone patent No. 3,893,339, and in the Sakamoto patent No. 3,895,964. The latter shows a floating ball which indicates the level of the electrolyte in the battery.

The above mentioned subject devices do have drawbacks with respect to either the possibility of misalignment and sticking of the floats, as well as the limitations with respect to the length of upward and downward travel of the elements to indicate the state of the electrolyte.

SUMMARY OF THE INVENTION

Accordingly, it is a principal object of this invention to provide a battery cap design in which the moving indicator elements are not prone to sticking or impeded movement due to friction or misalignment of the movable elements.

It is a further object of this invention to provide a battery cap indicator cap in which the movable elements which are to be viewed by the observer may have their length of vertical travel adjusted as desired independently of the vertical travel of the float elements in the electrolyte.

Another object of this invention is to provide a battery cap indicator in which the flag indicator elements are readily seen, and are of less weight such that they are more responsive to variation in electrolyte condition.

It is a still further object of this invention to provide a battery cap indicator assembly in which the travel of the indicator elements is more accurately controlled.

It is a further object of this invention to provide a battery cap indicator assembly in which the activating floats have a greater length of travel than that permissible with other indicator assemblies.

It is a still further object of this invention to provide a battery cap indicator assembly in which the force generated by movement of the floats is amplified through a linkage to preclude loss movement of the indicator elements A still furtber object of this invention is to provide a battery cap indicator assembly in which the indicator elements are more readily observable than in previous assemblies of this type.

These and further objects and features of this invention will be apparent from the following description of the invention.

DESCRIPTION OF THE INVENTION

Figure 1:
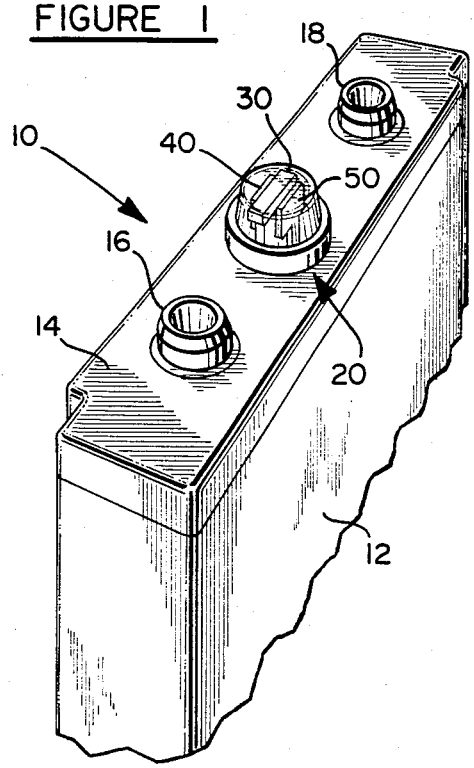
FIG. 1 is a prospective view of the top portion of a battery cell with the battery indicator assembly in position.

Referring particularly to FIG. 1, a battery cell unit is generally indicated at 10 showing the battery cap assembly in position. The battery cell includes sidewalls 12 and a battery top 14 which has as shown in FIG. 2 an access opening with a circular downwardly extending skirt 13 and an upwardly extending battery cap engaging flange 15.

The battery terminals 16 and 18 and the battery cap assembly generally indicated at 20 constitute the major elements at the top of the battery cell.

Figure 2:
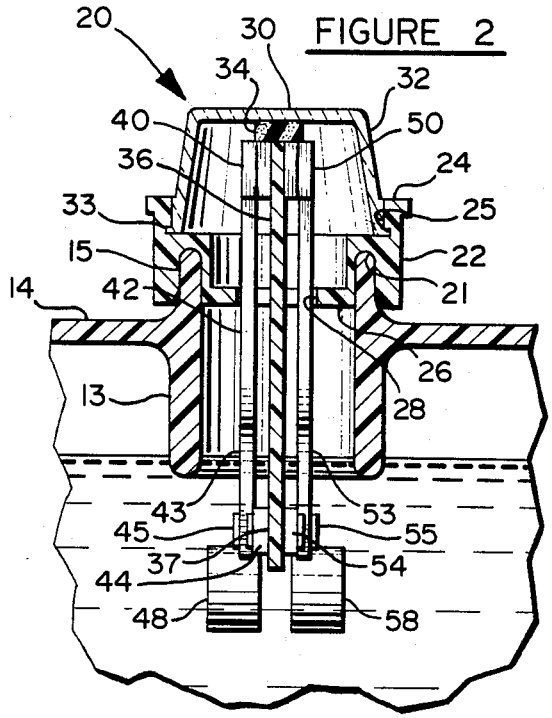
FIG. 2 is an enlarged cross-sectional transverse view of the battery indicator assembly of FIG. 1, showing the position of the elements when the electrolyte level and density are at maximum levels.
Figure 3:
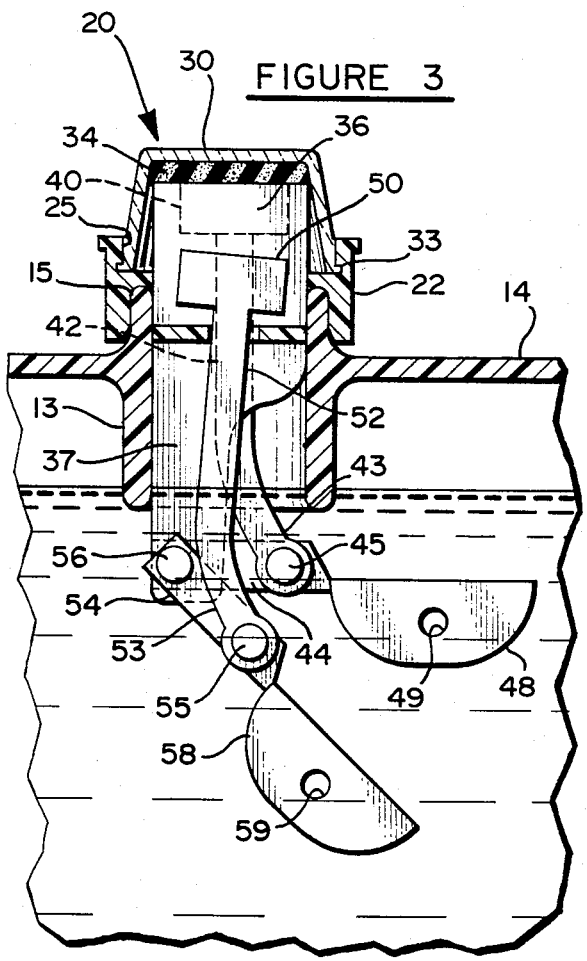
FIG. 3 is an enlarged longitudinal section of the battery indicator cap assembly of FIG. 1 in which the electrolyte level is satisfactory, but the electrolyte density is low.
Figure 4:
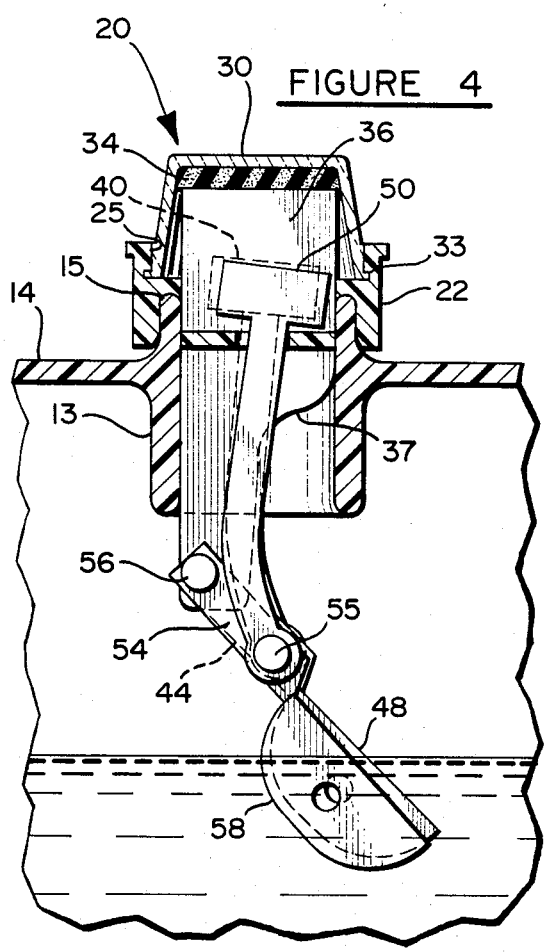
FIG. 4 is an enlarged transverse half-section of the battery indicator assembly of FIG. 1 when both the electrolyte level and density are low.

The details of the battery cap indicator assembly are shown in FIGS. 2, 3, and 4. These Figures show different views of the same indicator assembly illustrating the different positions of the indicator flag and floats for the several states of the battery electrolyte fluid.

Referring particularly to the structure of the battery cap indicator assembly 20 and referring particularly to FIG. 2, the battery indicator cap assembly 20 has a circular central body with a flange engaging skirt 22 which has a circular internal groove 21 which receives the upstanding flange of the battery case top 15 when the battery cap skirt is placed in position.

The battery flange engaging section 22 has an upper circular cap retaining section 24 which has an undercut grooved recess 25 on its inner surface.

The battery engaging section 22 has a circular bottom number 26 closing the battery access opening defined by the upstanding flange 15 of the battery to close the access opening. It has two spaced rectangular openings 27 and 28 through which the indicator support elements extend.

The battery indicator top is a hollow, upstanding circular dome-shaped element made of transparent plastic which has a flat top 30 and inwardly inclined circular side wall 32 the lower end of the side wall has a circular outwardly extending locking flange 33 which fits into and engages the inner periphery of the recess 25.

A longitudinal central portion of the cap has a vertically extending dividing element 36 which extends downwardly substantially below the cap and into the interior of the battery below the circular depending skirt 13 of the battery top. The lower section 37 is curved inwardly as shown in FIGS. 3 and 4, and has an opening 38 for receiving a pivot element. Immediately above the divider 36 is a small plastic sponge-like pad which covers the vent hole located in the middle of the top surface 30 of the clear plastic top.

There are two identical shaped flag and linkage assemblies, one for indicating level of the electrolyte, and the other for indicating the density of the electrolyte. Their differ in color of the indicator flag and the density of the float elements.

The liquid level indicator assembly shows on the left in FIG. 2 has a rectangular horizontal extending flag element 40 which is supported on a long link member 42, the lower portion of which is curved at 43 and has a circular opening at its lower extremity through which a connecting pin 45 extends to hold a pivoted link 44. The link 44 is pivotaly connected at one end to the lower end of the lower support section 37 of divider element 36 by a link which has an outwardly flat section 46 which holds the link in position. The short central link 44 supports at its other end the float 48. An opening 49 provides for weight adjustment and balance of the float.

The second indicator assembly has the same construction and elements. It has rectangular flag element 50 which is supported by the long link 52 which extends upwardly through the opening 28, and may be described as being "T"-shaped. The lower end of the link 52 has a curved section 53 with an annular section for receiving a circular cross-section connecting element. It is connected to the free end of a connecting link 54 and the connecting element swaged over at its ends to hold the two pieces together in freely movable relationship. The other end of link 54 is pivotaly connected to the lower end 37 of the dividor section 36 and held in pivoted relation with respect to it by the outer rim 56 of the pivot connecting element. The connection can be made by heat treating the ends of the cylindrical connecting element so as to provide a circular overlap end 56. This same proceedure is followed for each of the connecting elements. The other end of link 54 supports a float element 58 which has a circular weight adjusting opening 59. Upward or downward movement of the float results in movement of the link, and inturn movement of the indicator flag.

The linkage arrangement shown provides a multiplication factor of both force and length of travel so that the float can move a considerable vertical distance while the indicator flag moves substantially less. This leverage for permitting adjustment of length depending upon varying the length of the link or the point at which they are connected provides less constraint with respect to the vertical travel of the indicator flags.

The length of the linkage is selected so that the flag indicators will be in their upper most position when the level and electrolyte density are satisfactory, as shown in FIG. 2. In this position, both of the floats are extended outwardly at the end of their respective supporting links in a horizontal position.

If the density of the electrolyte becomes low due to dilution of the electrolyte the float 58 will sink as shown in FIG. 3 bringing the float 50 down to the bottom of the interior of the upper portion of the battery cap assembly and into contact with the bottom 28. At this position the indicator flag will not be seen through the transparent dome-shaped battery top, indicating that the electrolyte is deficient.

Note that the float 58 will drop even though the level of the electrolyte is satisfactory and has not changed from the maximum level of FIG. 2.

I claim:

1. A battery cap indicator assembly, comprising:
   (a) a battery cap adapted to be connected to a battery casing top to cover over an electrolyte access opening and which has a lower interior portion which extends downwardly through the access opening,
   (b) the cap having a hollow upstanding transparent battery top which permits visual inspection of the interior of the cap,
   (c) an indicator flag disposed within the battery cap and which moves upwardly and downwardly depending upon the condition of the electrolyte,
   (d) indicator flag support means connected to the lower portion of the cap and to the indicator flag for supporting and moving the indicator flag when there are changes in the state of the electrolyte,
   (e) a second indicator flag is disposed within the battery top and which moves upwardly and downwardly depending upon the condition of the electrolyte,
   (f) a second flag support means is connected to the lower portion of the cap and to the flag for supporting and moving the flag when there are changes in the state of the electrolyte,
   (g) the second indicator flag and flag support means being sensitive to, and indicating changes in, density of the electrolyte, and
   (h) the other indicator flag and flag support means being sensitive to, and indicating changes in, electrolyte level.

2. The battery cap indicator as set forth in claim 1, wherein:
   (a) both of the indicator flag support means includes a float and linkage for moving their respective indicator flag.

3. The battery cap indicator assembly, as set forth in claim 1, wherein:
   (a) the vertical movement of each of the floats is greater than that of their respective indicator flags, and is adjusted through the linkage to provide a full vertical range with respect to the available space in the battery casing top.

4. The battery cap indicator assembly, as set forth in claim 3, wherein:
   (a) the range of vertical float movement for both assemblies is approximately 2 to 4 times that of the indicator flag.

5. The battery cap indicator assembly, as set forth in claim 1, wherein:
   (a) the lower internal portion of the battery cap extends substantially below the battery casing top and contains a pivot at its lower end to which both flag support means are connected.

6. The battery cap indicator assembly, as set forth in claim 5, wherein:
   (a) each flag support means includes a link supported at the pivot at one end and supporting at its other end a float element, and
   (b) the indicator flag having a long downwardly extending link element which is pivotaly connected to the link which supports the float.

7. The battery cap indicator assembly as set forth in claim 1, wherein:
   (a) the indicator flag support means includes a short connecting link pivotally connected at one end to a downwardly depending element of the cap, and which has an elongated relatively thick flat-sided float member integral with the other end of the short link.

8. The battery cap indicator assembly as set forth in claim 7, wherein:
(a) the indicator flags being the upper portion of an elongated T-shaped member, the elongated lower portion of which is pivotally connected at its lower end to the connecting link immediately adjacent the float member, whereby the indicator flag is moved upwardly and downwardly depending upon the position of the float member.

9. The battery cap indicator assembly as set forth in claim 7, wherein:
(a) the float has a weight adjusting opening.

10. The battery cap indicator assembly as set forth in claim 8, wherein:
(a) the indicator flag is in its uppermost position when the connecting link is disposed in a horizontal position.

* * * * *